United States Patent [19]

Drake et al.

[11] Patent Number: 4,931,978
[45] Date of Patent: Jun. 5, 1990

[54] COMPUTER SUPPORT DEVICE WITH POWER CONTROL DEVICES

[75] Inventors: Craig D. Drake, Muscatine, Iowa; Phillip Ting, Chicago, Ill.

[73] Assignee: Ring King Visibles, Muscatine, Iowa

[21] Appl. No.: 260,863

[22] Filed: Oct. 21, 1988

[51] Int. Cl.$^5$ .......................... G06F 1/00; H05K 7/16
[52] U.S. Cl. .................................... 364/708; 108/143; 361/391
[58] Field of Search ............... 364/708; 361/380, 391, 361/417, 419; 200/5; 235/1 D, 145 A, 145 R, 146; 108/143, 137, 102; 312/333, 208

[56] References Cited

U.S. PATENT DOCUMENTS

| | | | |
|---|---|---|---|
| 4,496,200 | 1/1985 | Hagstrom et al. | 108/143 |
| 4,600,255 | 7/1986 | Dubarko | 312/333 |
| 4,709,972 | 12/1987 | Labudde et al. | 361/391 |

OTHER PUBLICATIONS

Global Computer Supplies catalog, Feb. 1988, p. 28.
Data Defender Accessories for Personal Computers catalog, pp. 16-17.
Pamphlets regarding surge suppressing and power protection products.

*Primary Examiner*—Gary V. Harkcom
*Assistant Examiner*—Long T. Nguyen
*Attorney, Agent, or Firm*—Neuman, Williams, Anderson & Olson

[57] ABSTRACT

A computer support device includes a housing and a keyboard drawer unit which is slidably supported on the inside of the housing for movement from a stored position to an extended position. The drawer unit contains a forward recessed section of sufficient size to accommodate a computer keyboard. The drawer unit also contains a rearward section which includes a recessed portion for storage as well as a switch assembly portion and a passageway for a keyboard power cord. The switch assembly portion includes a plurality of switches for control of the power supply to a computer and a host of peripheral devices. A power strip which includes devices for protection against electrical disturbances is connected to the drawer unit's switch assembly by a flexible power cord.

11 Claims, 2 Drawing Sheets

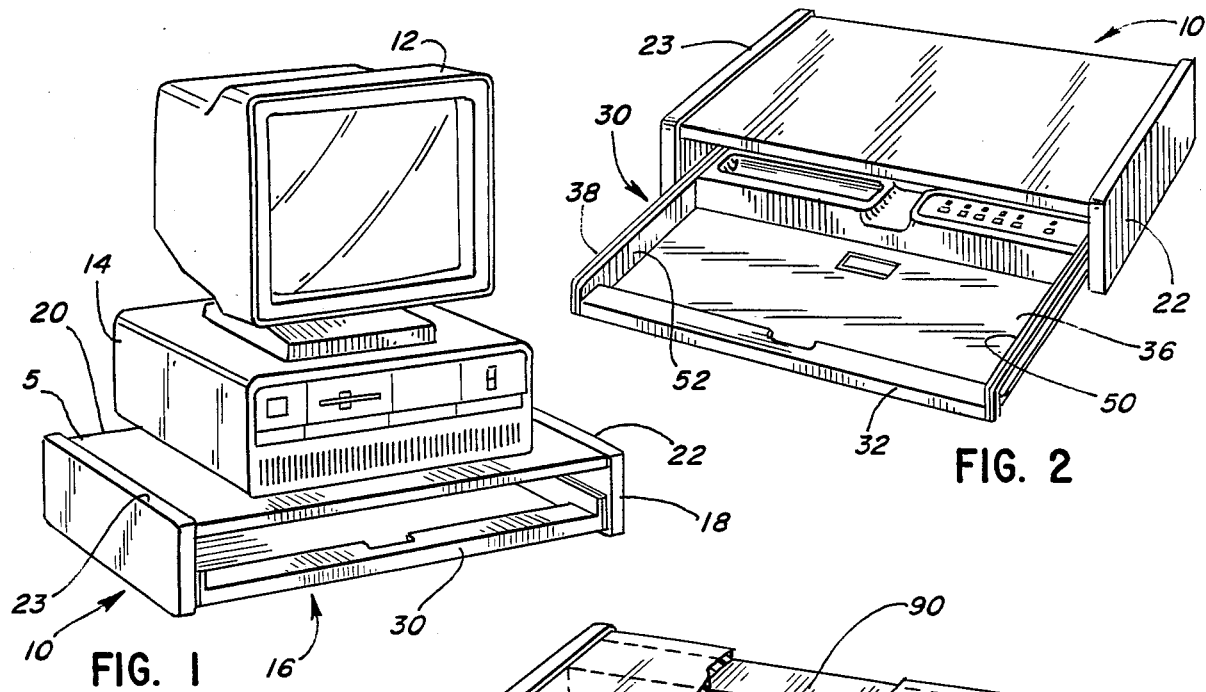
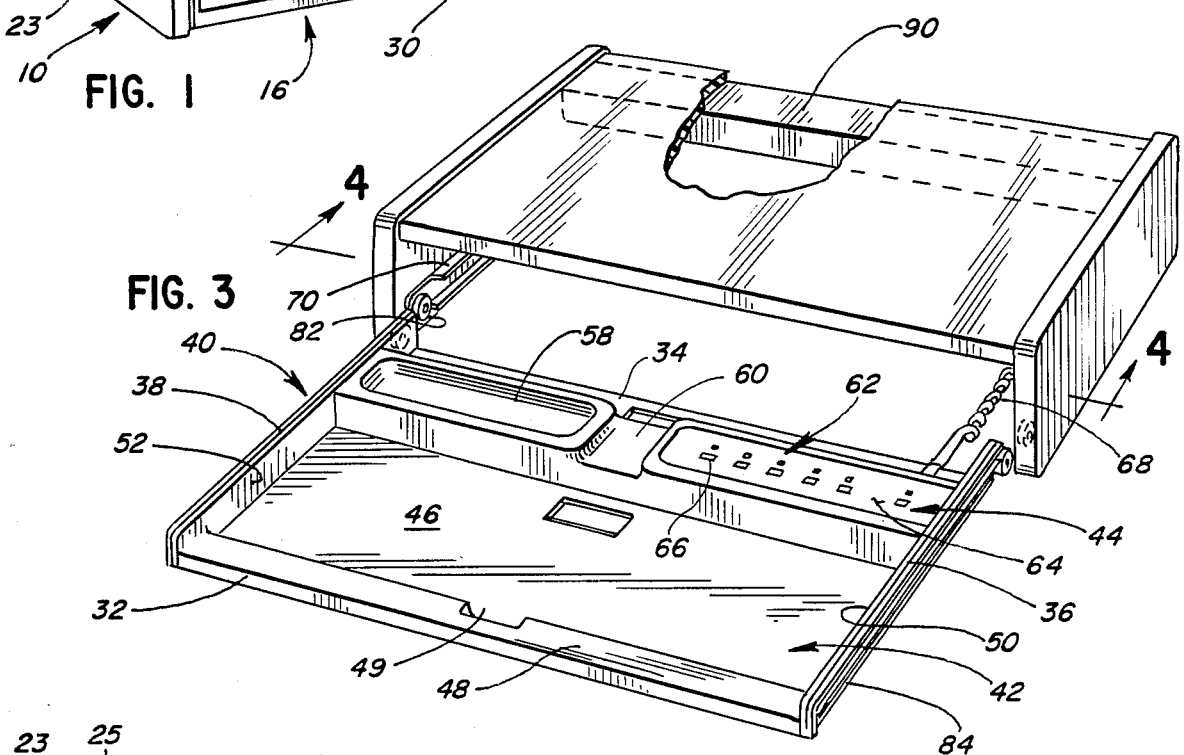
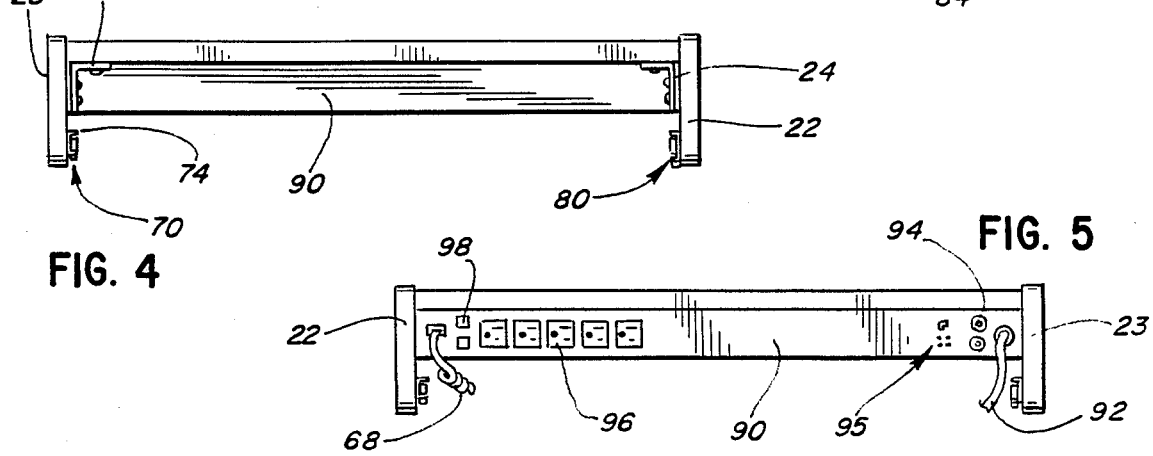

COMPUTER SUPPORT DEVICE WITH POWER CONTROL DEVICES

FIELD OF THE INVENTION

The present invention relates to computer support devices and, more particularly, to an improved computer support device having a retractable keyboard shelf and including a power strip mounted on and readily accessible from the rear side of the support housing and a switch panel mounted adjacent the keyboard location on the keyboard shelf for selectively operating computer peripherals. The computer keyboard shelf unit of the present invention can be pivotally or slidingly mounted below a computer workstation, or can be slidingly positioned within a support structure for a central processing unit (CPU), monitor, printer or other computer device.

BACKGROUND OF THE INVENTION

Computer users are familiar with the expansive array of peripheral components, such as monitors, printers, modems and the like which are frequently required. In addition to the space demands associated with the hardware itself, it is necessary to provide for power connections between the components and such filter equipment as is required to protect the equipment from electrical disturbances. A variety of devices have been developed to permit centralized control of a computer and its related peripheral equipment, while minimizing the space requirements for such hardware.

For example, a variety of computer support devices have been developed in which a computer CPU or monitor is supported above a support unit. The support unit may contain a sliding shelf or drawer unit which stores a computer keyboard, or such a shelf unit may be located below a computer workstation and be retractable through a sliding or pivotal motion. Frequently, such keyboard shelves are movably connected to a computer support device or a workstation desk top. A common type of keyboard is accessed by sliding a drawer unit from its stored position outward toward the operator. The drawer unit contains a section for holding a keyboard and may also contain a storage section or area for diskettes or other articles such as pens, pencils, paper clips and the like.

Typically, such computer support devices and keyboard drawers have not included power means, surge protectors or control switches. The computer and/or its peripherals are operated by switches on the respective devices or on a separate control box and are connected to an external power supply/electrical filter.

As a result of the diversity of types of computer peripheral devices which are accessed by a computer user, and the variety and interchangeability of computer user devices, such as portable units and specialty screens, there is a need for a computer support device which is able to provide a convenient central switching area for these peripherals and alternative terminals. Such a support device would allow power control of the CPU or any given peripheral from one central, easily-accessed switching area. The support device also should include a power strip with receptacles and circuit protection devices to enable the CPU, monitor, printer and other peripheral devices to derive power from one location, protected from electrical disturbances.

Heretofore, it has been known to mount peripheral control switches under such computer support devices but over the sliding keyboard shelves thereon. This arrangement has proven inefficient and difficult to access, particularly if the keyboard shelf is in a partially extended position. Further, prior art support devices of the type described above have not provided an integrated power strip in addition to allowing centralized switching and control over the power supply to the peripheral devices. This limits their utilization in that the CPU, and each peripheral, must be located near an electrical power supply and be able to access that supply. Further, the power controls of the peripherals are typically not centrally located and must be operated on each device in a separate operation.

The computer support device of the present invention eliminates these disadvantages by having an integrally mounted power strip and central switching area which allow power supply access and control of the power supply to the CPU and peripherals from the support device. By providing a central switching control, the present invention allows power control of the computer terminal and peripheral devices from one centralized and convenient location.

OBJECTS OF THE INVENTION

It is an object of this invention to provide an improved computer support, and particularly to provide a support housing which meets the aforenoted needs.

It is a specific object of this invention to provide a computer support which includes an integrated power strip and a central switching panel in a keyboard shelf or drawer unit for centralized control of the power supply to the computer and any peripheral devices.

It is another object of this invention to provide an improved computer support device which provides a centralized power supply for the computer and any peripheral devices.

It is a further object of this invention to provide an improved computer support device which avoids the disadvantages and complexities of the prior art.

It is another object of this invention to provide a computer support device with an integrated power strip and a sliding drawer unit with a computer keyboard area and storage areas.

Other objects, advantages and features of the present invention will become apparent upon reading the following detailed description and appended claims, and upon reference to the accompanying drawings.

SUMMARY OF THE INVENTION

In accordance with one embodiment of this invention, a computer support device which achieves the foregoing objects includes a housing having front and rear sides and inside and outside portions. The device includes a drawer unit which is slidably supported on the inside of the housing for movement from a stored position on the inside portion of the housing to an extended position at the front side of the housing on the outside portion.

The housing includes a pair of channel track assemblies mounted to the inside portion at opposite side ends. The drawer unit has roller and track assemblies mounted along its side edges, at their rear, with the track assemblies extending along the side edges of the unit. The drawer unit roller and track assemblies are received in the channel track assemblies of the housing. The drawer unit is moved between the inside and outside portions of the housing by sliding the rollers of the drawer unit along the channel track assemblies of the housing.

The drawer unit also contains a switch assembly located at the rear of the unit. A switch panel portion containing the switch assembly is located in a secondary section of the drawer unit, rearward of a forward recessed section. The forward recessed section is of sufficient size to accommodate a computer keyboard. The secondary section includes a rearward recessed portion for storage as well as the switch panel portion and a passageway for a keyboard power cord located between the storage portion and the switch panel portion. The switch panel portion includes a switch assembly having a plurality of switches for directing the power supply to the computer terminal and its peripheral devices.

The housing also includes a power strip mounted on the rear side and electrically connected to the switch assembly. The receptacles of the power strip are accessible from the rear side and the power strip includes circuit protection devices.

BRIEF DESCRIPTION OF THE DRAWINGS

For a more complete understanding of this invention, one should refer to the preferred embodiment illustrated in greater detail in the accompanying drawings and described below by way of an example of the invention. In the drawings:

FIG. 1 is a perspective view of a computer support device embodying this invention with the drawer unit in the closed position and a computer CPU and monitor supported on the top of the housing of the support device;

FIG. 2 is a perspective view of a computer support device with a sliding keyboard drawer unit shown in its partially extended position;

FIG. 3 is a perspective view of a computer support device with a sliding keyboard drawer unit shown in its extended position at the end of the track assemblies of the housing;

FIG. 4 is a sectional view of the computer support device taken along line 4—4 in FIG. 3;

FIG. 5 is a rear view of the computer support device illustrating the integrated power strip with receptacles;

DETAILED DESCRIPTION OF THE DRAWINGS

Figure 8:
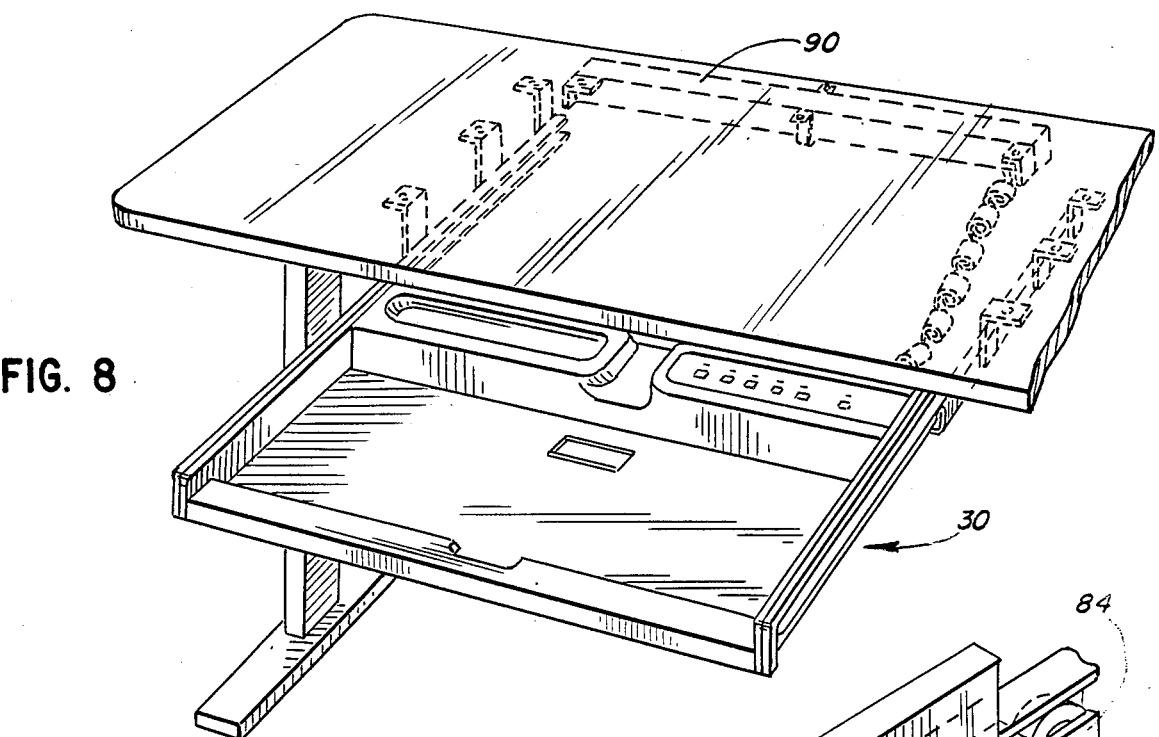
FIG. 8 is a perspective view of the keyboard drawer unit of the present invention, shown movably mounted to the underside of a computer workstation.

Turning now to the drawings, FIG. 1 shows a computer support device generally at 10, arranged to provide support for a computer monitor 12 and/or CPU 14. Although the monitor 12 and CPU 14 are of standard, desk-top form, the housing may also be used to support smaller portable computer units (not shown) or larger processing units (not shown). The computer equipment is supported on the top 15 of the housing. The bottom 16 of the housing is generally open. The housing includes a front side 18 and a rear side 20 and right and left sides 22 and 23, as viewed from the front of the housing.

The housing is preferably constructed of light weight materials, such as melamine laminated boards, which are sufficiently strong and sturdy to support a heavy CPU and monitor. Portions of the housing may be fastened in any reasonable manner (not shown), including bolts, adhesives, welding or the like. The top 15 is fastened to the sides 22, 23, and reinforced by bracing 24, 25, shown in FIG. 4.

The support housing 10 is shown in FIG. 2 with a drawer unit 30 in a partially open position, allowing access to a keyboard and various controls. The drawer unit 30 is shown in a partially open position outside of the housing 10 in FIG. 2, in contrast to the unit's stored position inside the housing 10, as shown in FIG. 1. The drawer unit 30 is substantially flat and generally rectangular. The unit 30 is bounded by a front distal edge 32 oriented toward the user's position, a rear edge 34 (shown in FIG. 3), and opposing side edges 36, 38. The top 40 of the drawer unit 30 is divided into a first section 42, located generally toward the front distal edge 32 of the unit, and a second area 44, located generally near the rear edge 34 of the unit.

The first section 42 of the drawer unit 30 includes a keyboard tray recess 46. The recess is formed in the drawer unit 30 and surrounded by a lip 48, located at the front edge 32; side walls 50, 52, located at the side edges 36, 38; and, a rear wall 54, located forward of and bordering on the secondary section 44. A handle 49 is formed in lip 48 to facilitate operator movement of the drawer unit 30 from the closed position to the open position. The recess 46 is of sufficient size and depth to allow placement of a standard computer keyboard within the unit 30. The lip 48 is also of sufficient width to allow resting of the hands of the operator on the lip while using the keyboard. An aperture 56 is formed in the base of the recess 46 to allow passage of any cords which may connect to the computer keyboard. Placement of the keyboard within the recess 46 allows access to the keyboard by extension of the drawer unit 30 to its open position and storage of the keyboard beneath the housing by returning the drawer unit to its stored position. The housing thus provides a compact and efficient manner of storage and access of the cumbersome computer keyboard.

The second section 44 of the drawer unit 30 includes a storage portion 58, a passageway 60 and a switching portion 62. The storage portion 58 is preferably of sufficient width and depth to allow storage of pencils or pens or the like. Alternatively, the storage area may be of sufficient depth to allow storage of diskettes (not shown).

The passageway 60 is a recessed area for passage of the keyboard cord (not shown) to the housing area. The tunnelling is provided to insure a resting of the cord within the area and avoid entanglement of the cord with the movement of the drawer unit 30. The switching portion 62 includes a switching assembly 64 and a plurality of switches 66. Switches 66 control the power supply to the computer and peripheral devices (not shown). Within the switching assembly 64 is an electrical network (not shown) which is accessed by power cable 68. The power cable 68 is connected to an external power strip 90, shown in FIG. 5. Once properly connected, operator manipulation of the switches 66 allows power control of the computer and its peripheral devices from the drawer unit 30.

Figure 6:
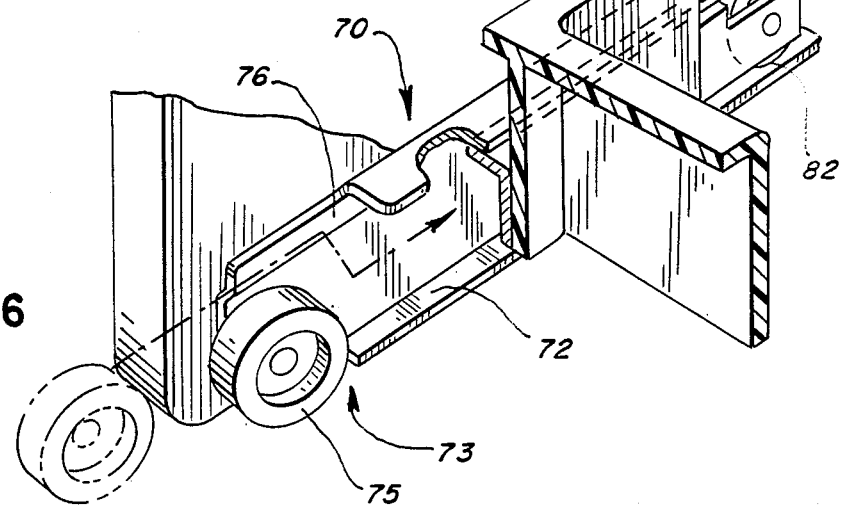
FIG. 6 is an exploded sectional view, shown in perspective, of the housing and drawer unit track assemblies.

The drawer unit 30 is supported in the housing by a pair of housing track assemblies 70, 80, as shown in FIGS. 3 and 4. The track assemblies 70, 80 are mounted on the inside of the sides 23, 22 of the housing, respectively. Each housing track assembly includes a channel member 72 having a front end 73 and a rear end 74. The front end 73 includes a round stop member 75 and a slot 76, located rearward of the stop member 75, shown in FIG. 6.

Figure 7:
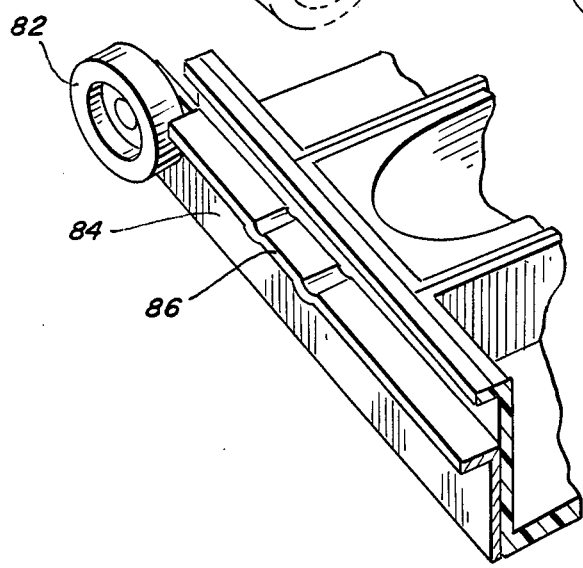
FIG. 7 is an exploded perspective view of the stop member in the housing track assembly.

The drawer unit 30 moves on the track assemblies 70, 80 by rollers 82, located at the rear end of the drawer unit, and unit track assemblies 84, located at the sides of the drawer unit. As the assemblies on each side of the drawer unit and housing are essentially identical, only the left side is shown in detail and described. The rollers 82 enter the housing track assembly 70 through the slot 76. The unit rollers 82 slide along the housing track assembly 70 from the stop member 75 at the front end 73, when the unit is in the open position, to the rear end 74 of the track assembly 70, when the unit is in the closed position. The round stop member 75 allows easy removal of the drawer unit 30 from the housing track assembly 70. Thus, the drawer unit 30 is easily moved by the operator from the closed position to the open position by sliding the rollers along the track assemblies. Stop member 86, shown in FIG. 7, releasably engages drawer unit roller 82 when drawer unit 30 is extended to its open position to restrain horizontal sliding movement of the drawer unit 30 while the keyboard is in use.

As previously mentioned, the switches 66 in the drawer unit 30, when properly connected, control the power of the terminal and any peripheral devices. The switches 66 are connected to a power strip 90 by power cable 68. The power strip 90 is itself connected to an external power supply by power cord 92. The power strip 90 also includes circuit breakers 94 and additional power outlets 96. Also included, but not shown, are surge protection devices contained within power strip 90. Optionally, such surge protection equipment can include an alarm with a shut-off switch as is illustrated at 95 in FIG. 5. The power outlets 96 allow connection of the power cords of the computer, including the central processing unit 14 and the power cords of any peripheral devices (not shown). Proper electrical network connection allows control of the power supply to the terminal and peripherals by the switches 66 of the drawer unit 30.

Also mounted at the back side of the support housing and, in the power strip box 90 in the preferred embodiment, are outlets 98 for the interconnection of telecommunication components.

Thus, a computer support housing has been provided which meets the aforestated objects. The stand has a centralized control of the power supply to the computer terminal and peripheral devices. It provides an integrated power strip which is easily accessible from the rear of the housing. It provides a sliding drawer unit with a recessed keyboard area and storage area.

FIG. 8 shows an alternative embodiment of the present invention. It will be appreciated that the novel keyboard drawer unit described herein need not necessarily be included within a desk top computer support housing. For example, the advantages of the present invention may be realized in a computer workstation where the keyboard drawer unit is movably positioned under the work surface, such as being slidingly engaged therein or pivotally mounted with respect thereto. The corresponding power strip can be mounted on the under-the-counter drawer unit, on the underside of the workstation counter or to some other portion of the workstation.

While one preferred embodiment of the invention is illustrated, it will be understood, of course, that the invention is not limited to this embodiment. Those skilled in the art to which the invention pertains may make modifications and other embodiments employing the principles of this invention, particularly upon considering the foregoing teachings.

What is claimed is:

1. A computer control assembly for use with a computer support structure, said assembly comprising:
    an electrical power supply unit including multiple power outlets;
    a movable keyboard unit which includes a plurality of manually operable electrical control switches and means for supporting a computer keyboard adjacent to said switches, said means for supporting a computer keyboard having a forward distal edge to be disposed toward a user of said keyboard unit;
    means for operatively connecting said keyboard unit to such a computer support structure to permit extension and retraction movement of said keyboard unit toward and away from such a user; and
    a flexible power cord connecting said electrical control switches to said power supply unit, whereby said switches are moved with said keyboard unit as said keyboard unit is extended relative to such support structure for use by such a user and retracted for storage.

2. The invention as in claim 1 wherein said keyboard unit includes a section for receiving and supporting such computer keyboard, and said control switches are mounted within such section.

3. The invention as in claim 1 wherein said keyboard unit is a unitary molding for receiving and supporting such computer keyboard and said control switches.

4. The invention as in claim 1 wherein said control switches are disposed rearward of such computer keyboard.

5. A computer support structure comprising:
    a housing having a front side, a rear side, a left side, a right side, an inside portion and an outside portion;
    a drawer unit including a switch assembly mounted thereon;
    means slidably connecting said drawer unit to said housing for movement between a stored position at said housing inside portion and an extended position at said housing outside portion;
    a power strip mounted on said housing and accessible from the rear side thereof; and
    a power cable connecting said power strip and said switch assembly.

6. The computer support structure of claim 5 wherein said drawer unit has a forward distal edge disposed toward a user, a rear edge and opposing side edges therebetween, said drawer unit defining a keyboard recess of a size to accommodate therein a computer keyboard adjacent its forward distal edge and a secondary area disposed rearward of said recess, said secondary area of a size to accommodate a storage area and an area for said switch assembly and a passageway located between said storage area and said switch assembly area for a keyboard connecting cord.

7. The computer support structure of claim 6 wherein said switch assembly includes a plurality of switches mounted in said switch assembly area, said switches operable for electrical actuation of the computer peripheral devices.

8. The computer support structure of claim 5 wherein said means for slidably connecting said drawer unit to said housing comprises:
   a pair of housing track assemblies mounted on the inside faces of the left and right sides of said housing; and
   a pair of drawer unit track assemblies mounted on opposite sides of said drawer unit, each of said housing and drawer unit track assemblies including rollers and configured for sliding engagement therebetween.

9. The computer support structure of claim 8 wherein said housing track assemblies each comprise a channel member and a stop member, each said channel member having a front end and a rear end and configured to receive the rollers of said drawer unit track assemblies, said stop member being located at the front end of said channel and acting to limit sliding movement of the rollers of said drawer unit track assemblies, thereby restricting movement of said drawer unit outside the housing to said extended position.

10. The computer support structure of claim 9 wherein the housing track assemblies include a slot located rearward of said stop member, said slot permitting access of said drawer unit track assemblies to said channel members at the drawer unit extended position.

11. The computer support structure of claim 5 wherein said power strip is mounted within said housing and further includes circuit protection means.

* * * * *